US011837037B2

United States Patent
Zsigray, III et al.

(10) Patent No.: US 11,837,037 B2
(45) Date of Patent: Dec. 5, 2023

(54) UNIVERSAL SECURE MOBILE DEVICE ENTRY UPGRADE ELECTRONICS UNIT FOR ELECTRONIC LOCKS AND METHOD OF USE THEREOF

(71) Applicant: OpenKey, Inc., Plano, TX (US)

(72) Inventors: Stephen Vincent Zsigray, III, Plano, TX (US); Eric Daley, Franklin, MA (US); Christopher Shane Hickingbottom, Oak Point, TX (US); Todd J. Person, Frisco, TX (US)

(73) Assignee: OpenKey, Inc., Plano, TX (US)

( * ) Notice: Subject to any disclaimer, the term of this patent is extended or adjusted under 35 U.S.C. 154(b) by 428 days.

(21) Appl. No.: 17/093,231

(22) Filed: Nov. 9, 2020

(65) Prior Publication Data

US 2021/0134093 A1 May 6, 2021

Related U.S. Application Data

(63) Continuation of application No. 16/668,981, filed on Oct. 30, 2019, now abandoned.

(51) Int. Cl.
*G07C 9/00* (2020.01)
*G06F 1/14* (2006.01)
(Continued)

(52) U.S. Cl.
CPC .......... *G07C 9/00182* (2013.01); *G06F 1/14* (2013.01); *G08B 3/10* (2013.01); *H04W 12/06* (2013.01);
(Continued)

(58) Field of Classification Search
CPC ............ G07C 9/00182; G07C 9/00309; G07C 9/00563; G07C 9/00571; G07C 9/00;
(Continued)

(56) References Cited

U.S. PATENT DOCUMENTS

| 11,023,875 B2* | 6/2021 | Eberwine ........... G06Q 20/3829 |
| 2008/0215841 A1* | 9/2008 | Bolotin ............... G06F 12/1466 |
| | | 711/E12.091 |

(Continued)

FOREIGN PATENT DOCUMENTS

| CN | 1279175 A | * | 1/2001 |
| CN | 204196843 U | * | 3/2015 |

*Primary Examiner* — Orlando Bousono
*Assistant Examiner* — Anthony D Afrifa-Kyei
(74) *Attorney, Agent, or Firm* — Kowert, Hood, Munyon, Rankin & Goetzel, P.C.

(57) ABSTRACT

A universal secure mobile device entry upgrade for electronic locks adds a wireless unlocking functionality to an existing host lock assembly. An electronics unit having a processing unit, a wireless communication device, a lock input, and a lock output is installed between a host motor output and host motor of a host lock. The original unlocking functionality of the host lock is maintained by either repeating an unlock signal from the host motor output to the host motor using the processing unit, or through a two-position switch that passes a host unlock signal to the host motor by default, but switches to a second position that allows an unlock signal to be sent to the host motor when a wireless unlocking is signaled from a mobile unlocking device such as a smartphone or the like. An integrated security chip and real-time clock may be included to increase security.

20 Claims, 12 Drawing Sheets

(51) Int. Cl.
  *H04W 12/06*   (2021.01)
  *H04W 76/14*   (2018.01)
  *G08B 3/10*    (2006.01)
  *H04W 12/47*   (2021.01)
  *H04W 88/02*   (2009.01)

(52) U.S. Cl.
  CPC ........... *H04W 12/47* (2021.01); *H04W 76/14* (2018.02); *H04W 88/02* (2013.01)

(58) Field of Classification Search
  CPC ...... G07C 9/00174; G07C 2009/00769; G07C 9/0069; G07C 2009/00317; G07C 2009/00341; G07C 2009/00365; G07C 2009/00388; G07C 2009/00412; G07C 2009/0042; G07C 2009/00507; G07C 2009/00555; G07C 9/00896; H04W 76/14; H04W 12/47; H04W 12/06; H04W 88/02; G06F 1/14; G08B 3/10; G08B 29/123; E05B 47/0001; E05B 2047/0095; E05B 35/10; E05B 67/003; E05B 67/22; G06K 7/10297
  See application file for complete search history.

(56) References Cited

U.S. PATENT DOCUMENTS

| | | |
|---|---|---|
| 2011/0050391 A1 | 3/2011 | Denison |
| 2015/0107316 A1 | 4/2015 | Kirkjan |
| 2016/0291966 A1 | 10/2016 | Johnson |
| 2018/0253917 A1* | 9/2018 | Kazerani ............ G07C 9/00571 |
| 2019/0299756 A1* | 10/2019 | Asher ................... B60J 5/0416 |
| 2019/0386513 A1* | 12/2019 | Bavisi .................. B60R 25/403 |

* cited by examiner

UNIVERSAL SECURE MOBILE DEVICE ENTRY UPGRADE ELECTRONICS UNIT FOR ELECTRONIC LOCKS AND METHOD OF USE THEREOF

The present application is a continuation of U.S. application Ser. No. 16/668,981, filed Oct. 30, 2019, the disclosure of which is incorporated by reference herein in its entirety.

FIELD OF THE INVENTION

The present invention relates generally to electronic locks. More particularly, the present invention relates to upgrading existing electronic locks to include unlocking functionality through wireless communication with mobile devices.

BACKGROUND OF THE INVENTION

A lock is a mechanical or electronic fastening device that is released by a physical object (such as a key, keycard, fingerprint, RFID card, security token, coin etc.), by supplying secret information (such as a number or letter permutation or password), or by a combination thereof or only being able to be opened from one side such as a door chain. Locks are most commonly used to secure doors or other apertures against opening, such as the front door to a home, apartment, or hotel room, or gates, safes, or the like.

One area where locks are integral is in hotels, where each room is secured against entry by anyone but the occupant or other individual in possession of the appropriate key or other unlocking device. Recent years have seen rapid advancement in technology, and as such hotels may desire to upgrade their locks to reflect modern standards. Upgrades over traditional physical locks requiring a physical key, such as pin tumbler locks, include the integration of electronically based technology such as magnetic stripe card readers and near-field communication (NFC) or radio frequency identifier (RFID) readers, which upon receiving the appropriate electronic signal, actuate a motor in order to unlock the lock. While these are relatively modern technologies, further improvements in technology have provided the means to upgrade locking apparatuses even further.

The smartphone is nearly ubiquitous in modern society, and with its modern processing and communication capabilities enables electronic interfacing with and control over a broad range of devices. Such control requires relatively simple hardware and software to be implemented in the device with which it is desired to enable such interfacing. A hotel or other entity desiring to upgrade its currently installed electronically-controlled locking systems, instead of purchasing an entirely new model of lock, may elect to save money on upgrading their current locks by installing the present invention, providing additional wireless unlocking functionality over Bluetooth or similar wireless communication protocols using a smartphone or similar device.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a universal secure mobile device entry upgrade electronics unit for existing electronic locks. The present invention may be integrated into an existing electronic lock, or host lock in order to upgrade its functionality to include unlocking via mobile computing devices such as cell phones or other suitable devices. The present invention provides the capability to securely receive digital keys from mobile devices through wireless communication and unlock the host lock without disrupting the host lock's existing functionality, which may include unlock via key card, for example. In the preferred embodiment, the apparatus of the present invention has a small form factor (approximately 1 inch by 1.5 inches by 0.25 inches) and so may be installed within the existing housing of the host lock, inside a cutout in the door to which the host lock is attached, or in a separate housing compartment attached to the host lock or door.

In general, the apparatus of the present invention is a singular electronics unit comprising one or more electronic components such as, but not limited to, printed circuit boards (PCBs), microcontrollers, integrated circuits, resistors, capacitors, diodes, voltage regulators, or any other electrical or electronic components suitable for achieving the purpose of the present invention.

Figure 1:
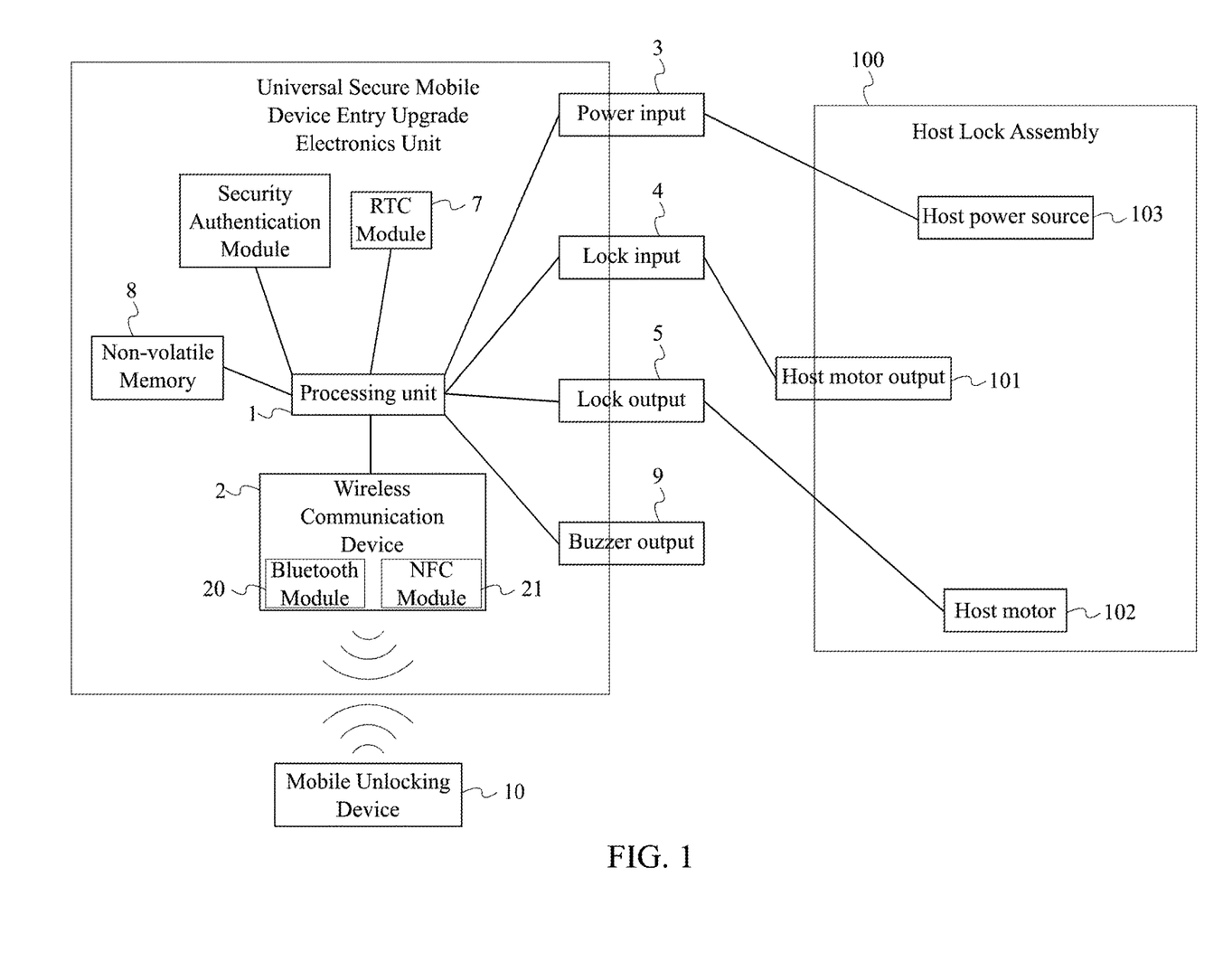
FIG. 1 is a general diagram of the apparatus of the present invention connected to a host lock assembly.

Referring to FIG. 1, the apparatus in the preferred embodiment of the present invention is a circuit board comprising a processing unit 1, a wireless communication device 2, a power input, a lock input 4, and a lock output 5. The processing unit 1 is electronically connected to the wireless communication device 2, and is electronically connected to the power input, the lock input 4, and the lock output 5. The wireless communication device 2 may be any such device that facilitates wireless communication with one or more external devices such as smartphones or the like. In the preferred embodiment, the wireless communication device 2 uses a technology standard for exchanging data between fixed and mobile devices over short distances using short-wavelength UHF radio waves in the industrial, scientific and medical radio bands, from 2.400 to 2.485 GHz, and building personal area networks (PANs), such as, but not limited to, Bluetooth technology. In some embodiments, the wireless communication device 2 comprises a Bluetooth module 20. In various embodiments, various technologies and standards may be utilized with or as the wireless communication device 2 as suitable. In some embodiments, the wireless communication device 2 may comprise a near-field communication (NFC) module 21. The processing unit 1 may be a microcontroller or other similar electronics unit suitable for receiving electronic input signals, executing computer-executable instructions such as machine code or programming language code, and sending electronic output signals. In the preferred embodiment, the power input, the lock input 4, and the lock output 5 are simple electrical connections intended for interfacing with corresponding components of the host lock, though in various embodiments, said inputs and outputs may vary according to the requirements for interfacing with the host lock's electronics, which may vary across different models of host locks. In some embodiments, the said inputs and outputs may require a host lock-specific harness to do so.

Figure 2:
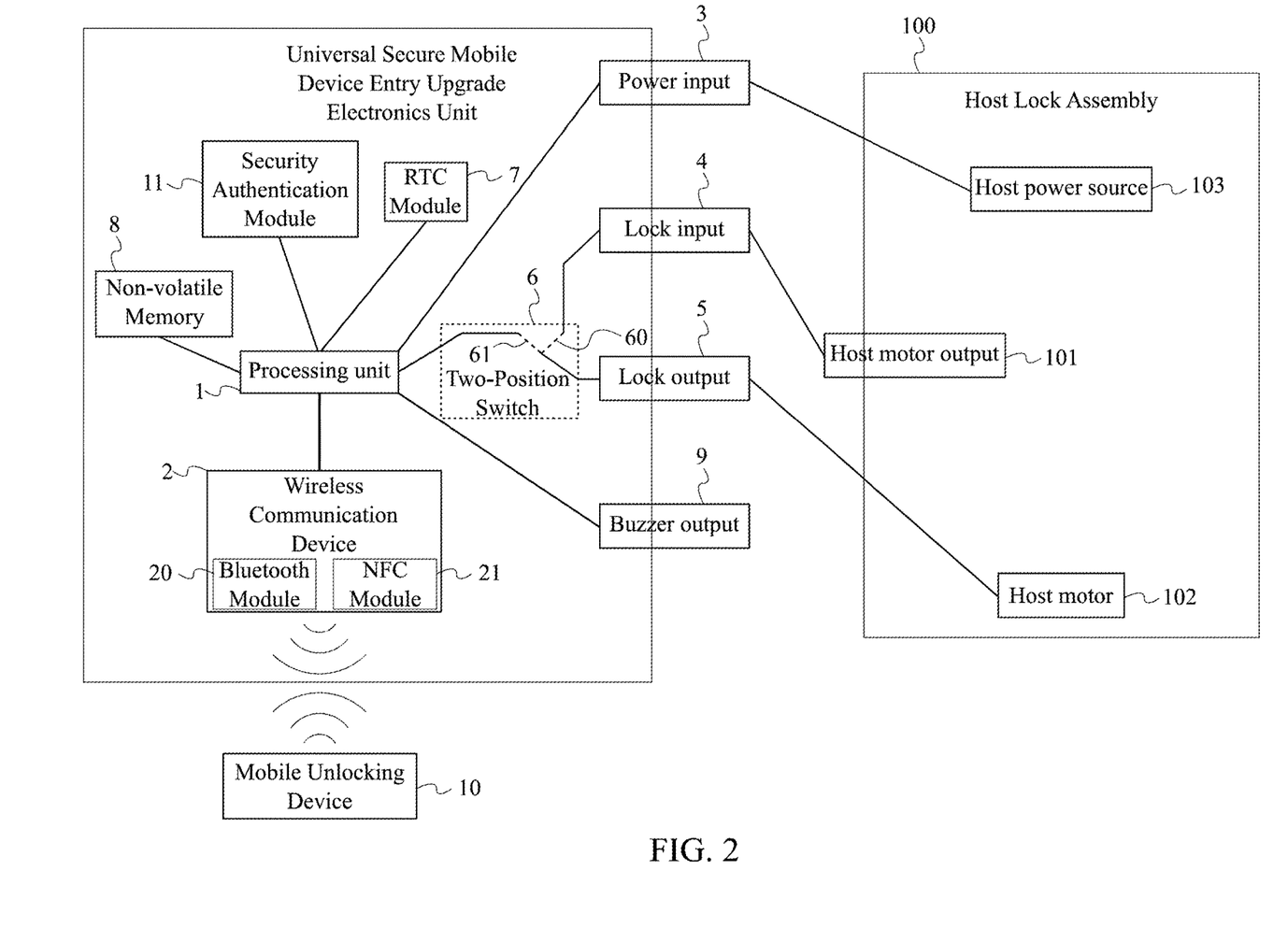
FIG. 2 is a general diagram of the apparatus of the present invention incorporating a two-position switch.

Referring to FIG. 2, in some embodiments, the apparatus of the present invention further comprises a two-position switch 6 that is electrically connected to the processing unit 1. The two-position switch 6 is configured to stably occupy either a host key position 60 or a digital key position 61, with the lock input 4 being electrically connected to the lock output 5 through the two-position switch 6 in the host key position 60, and the lock output 5 being electrically connected to the processing unit 1 through the two-position switch 6 in the digital key position 61. The two-position switch 6 enables the added wireless unlocking functionality of the present invention while allowing the original operation of the host lock to remain uninterrupted in some embodiments, as will be further disclosed hereinafter.

In some embodiments, the apparatus of the present invention further comprises a real-time clock (RTC) module 7 that is electronically connected to the processing unit 1. The RTC module 7 may be used to authenticate digital key payloads in some embodiments. Furthermore, in some embodiments, the apparatus of the present invention may comprise a non-volatile memory 8 electronically connected to the processing unit 1, which may be used to log digital key payloads. Additionally, in some embodiments, the apparatus of the present invention may comprise a buzzer output 9 electronically connected to the processing unit 1, which may be used to actuate a buzzer or other sound-producing device in order to provide auditory feedback to the user upon successfully unlocking the host lock using the present invention.

In the method of the present invention, a host lock assembly 100 is provided comprising a host motor output 101, a host motor 102, and a host power source 103. The processing unit 1, wireless communication device 2, power input, lock input 4, and lock output 5 are further provided, wherein the host power source 103 is electrically connected to the power input, the host motor output 101 is electrically connected to the lock input 4, the lock output 5 is electrically connected to the host motor 102, the processing unit 1 is electronically connected to the wireless communication device 2, and the processing unit 1 is electrically connected to the power input, the lock input 4, and the lock output 5. The host motor 102 is the original motor included with the host lock assembly 100 that, when actuated, unlocks the host lock assembly 100 and allows its corresponding door to be opened. The host motor output 101 represents the electrical output from an on-board processing unit of the host lock to the host motor 102, wherein the host lock is originally designed to actuate the host motor 102 by sending an unlock signal through the host motor output 101 to the host motor 102 in order to unlock the host lock. The host power source 103 may vary in nature, but is understood to be whatever source of electrical power originally used to power the host lock assembly 100, whether the host power source 103 be a battery, a capacitor, or a wired connection to an external source of electrical energy.

Figure 7:
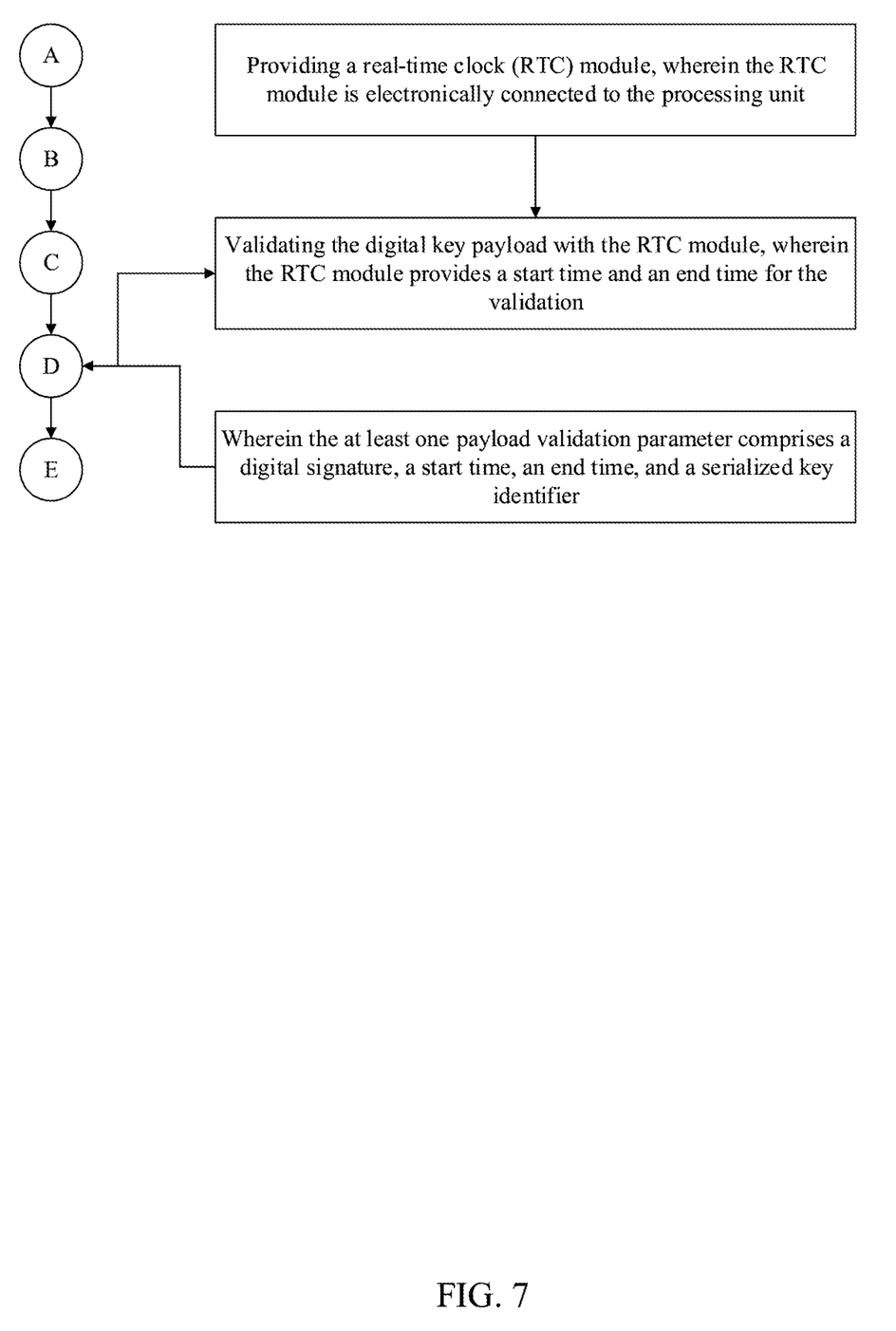
FIG. 7 is a stepwise flow diagram describing components of the at least one payload validation parameter in the method of the present invention.

Furthermore, at least one validation parameter is provided for validating digital key payloads, and a mobile unlocking device 10 is provided, wherein the mobile unlocking device 10 may be a mobile computing device such as, but not limited to, a smart phone or the like, or in some embodiments the mobile unlocking device 10 may be an NFC unlocking device. In some embodiments, the at least one validation parameter may comprise one or more of a digital signature, a start time, an end time, and a serialized key identifier as shown in FIG. 7, though the specific nature of the at least one validation parameter may vary as desired in different embodiments.

Figure 3:
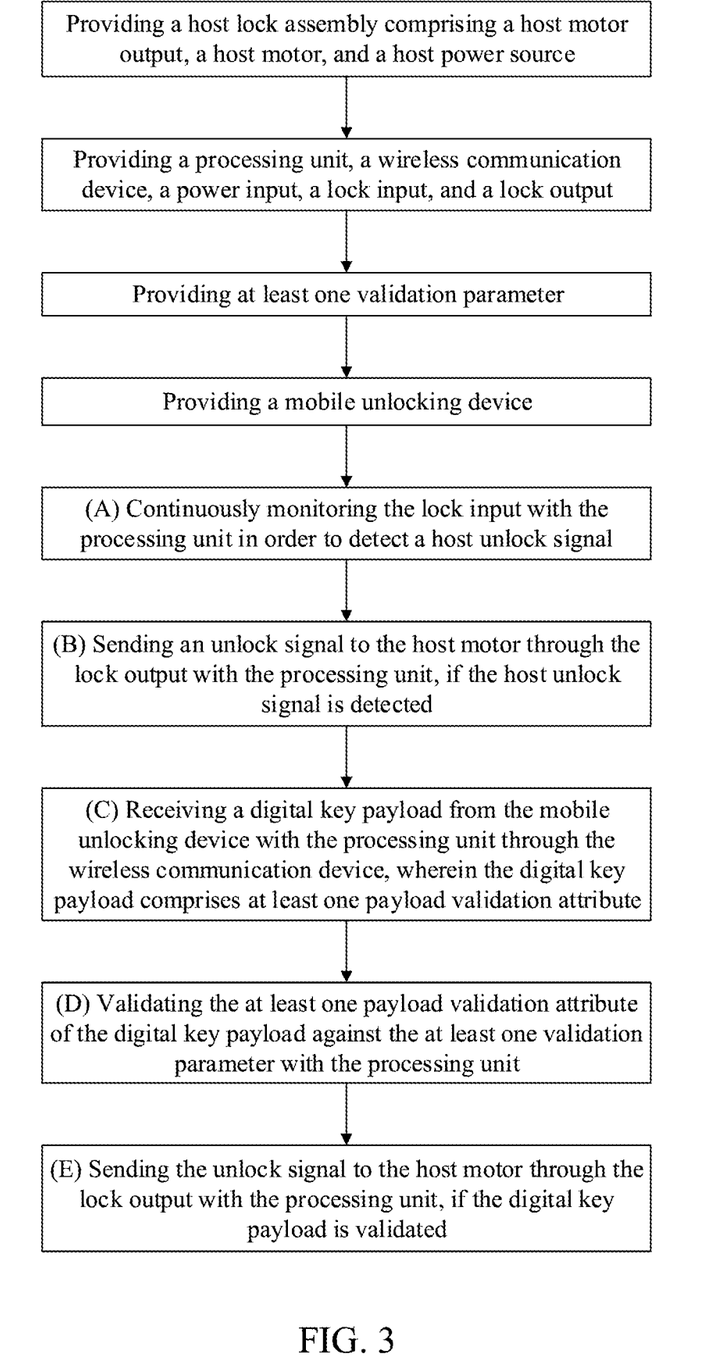
FIG. 3 is a stepwise flow diagram of the general method of the present invention.

In the general method of the present invention as shown in FIG. 3, the processing unit 1 continuously monitors the lock input 4 in order to detect a host unlock signal (step A), and an unlock signal is sent to the host motor 102 through the lock output 5 with the processing unit 1, if the host unlock signal is detected (step B). Steps A and B facilitate the original functionality of the host lock, as the apparatus of the present invention is installed between the host lock output 5 and the host motor output 101.

Figure 9:
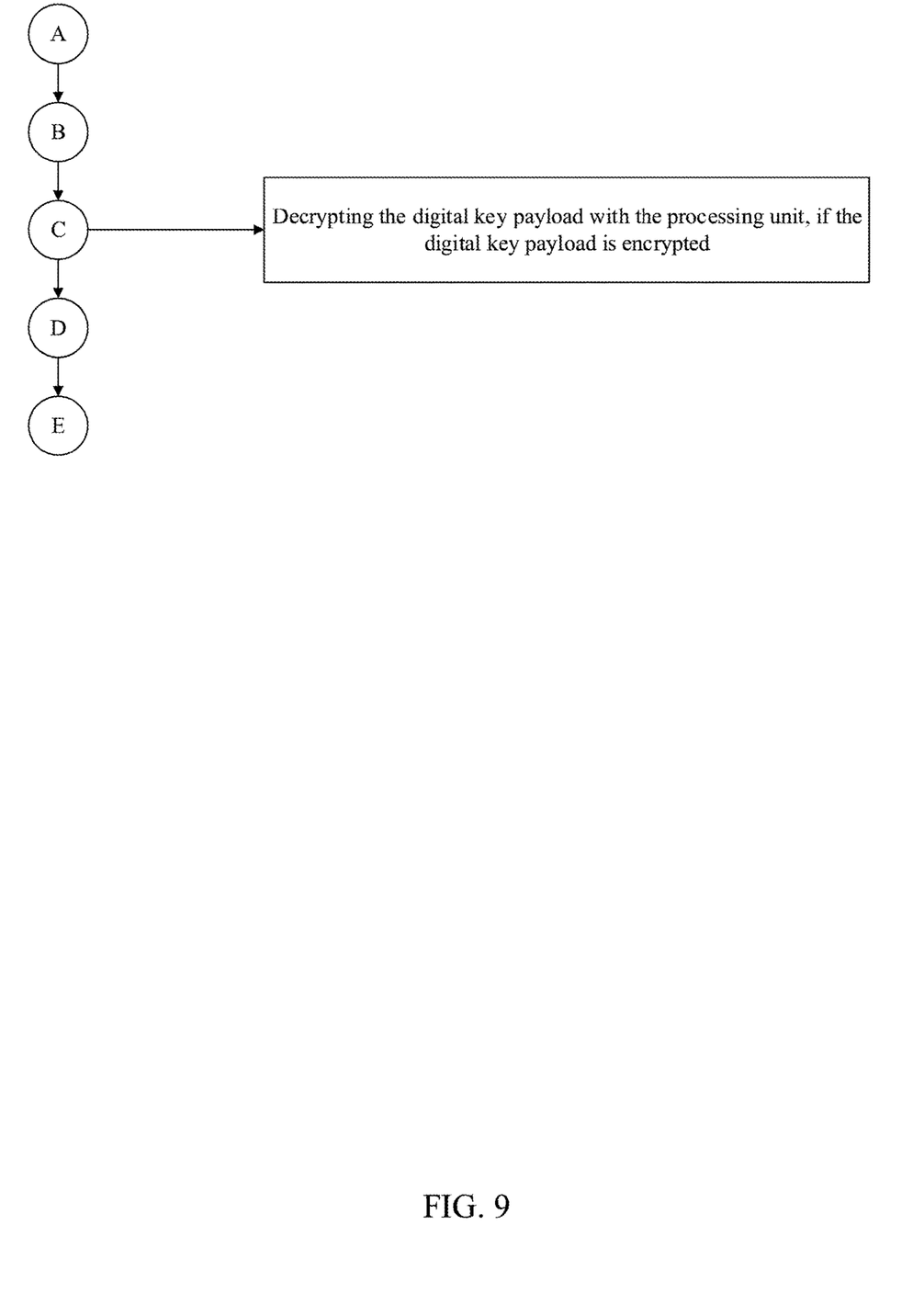
FIG. 9 is a stepwise flow diagram showing a step for decryption of the digital key payload in the method of the present invention.

In order to facilitate the added wireless unlocking functionality of the present invention, a digital key payload may be received from the mobile unlocking device 10 with the processing unit 1 through the wireless communication device 2, wherein the digital key payload comprises at least one payload validation attribute (step C). Furthermore, the digital key payload is decrypted with the processing unit 1, if the digital key payload is encrypted, as shown in FIG. 9. Alternatively, the digital key payload may be decrypted with the security authentication module 11 in some embodiments. The at least one payload validation attribute of the digital key payload is then validated against the at least one validation parameter with the processing unit 1 (step D), and the unlock signal is sent to the host motor 102 through the lock output 5 with the processing unit 1, if the digital key payload is validated (step E).

Figure 5:
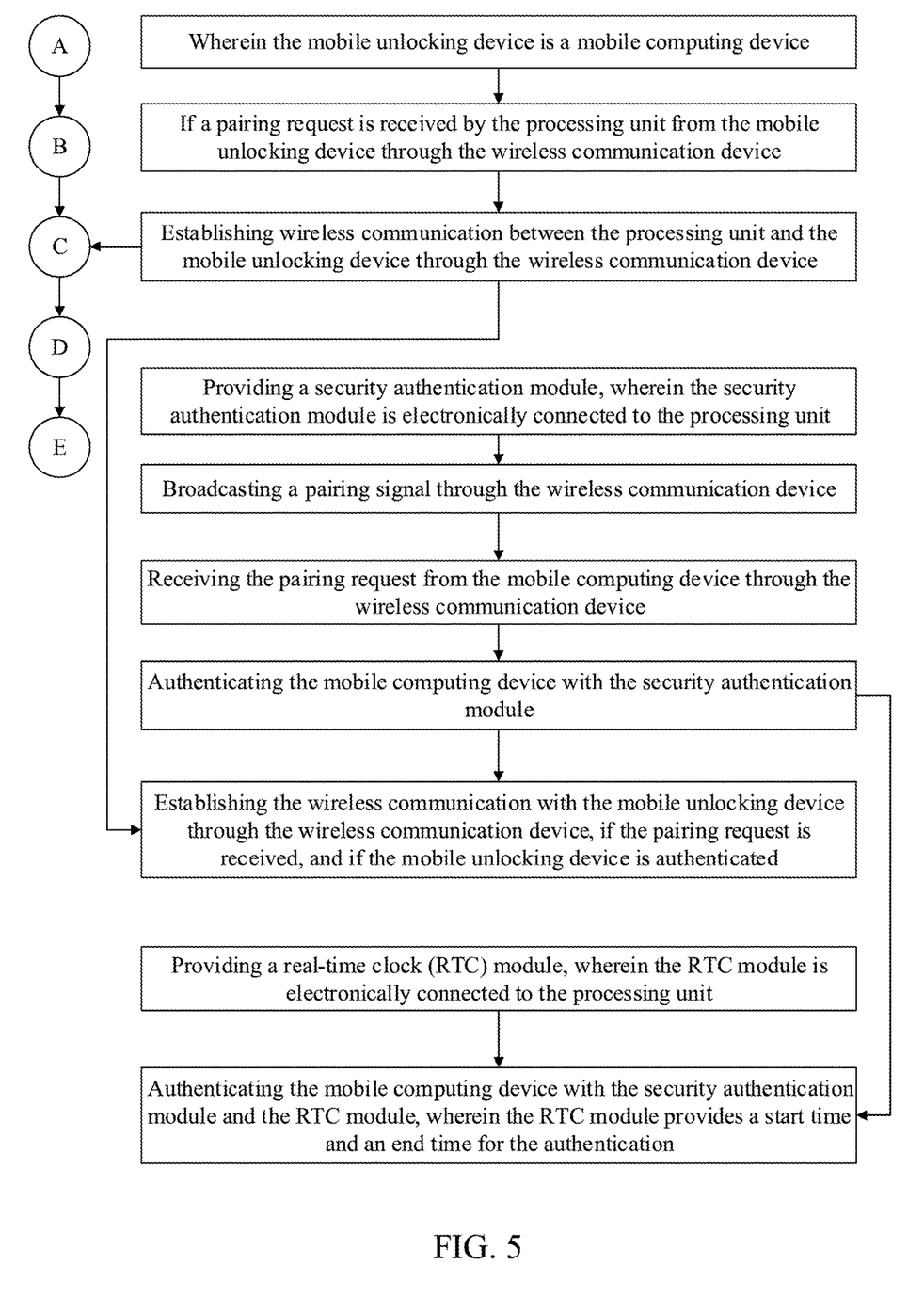
FIG. 5 is a stepwise flow diagram showing steps for pairing with and authenticating a mobile unlocking device in the method of the present invention.
Figure 6:
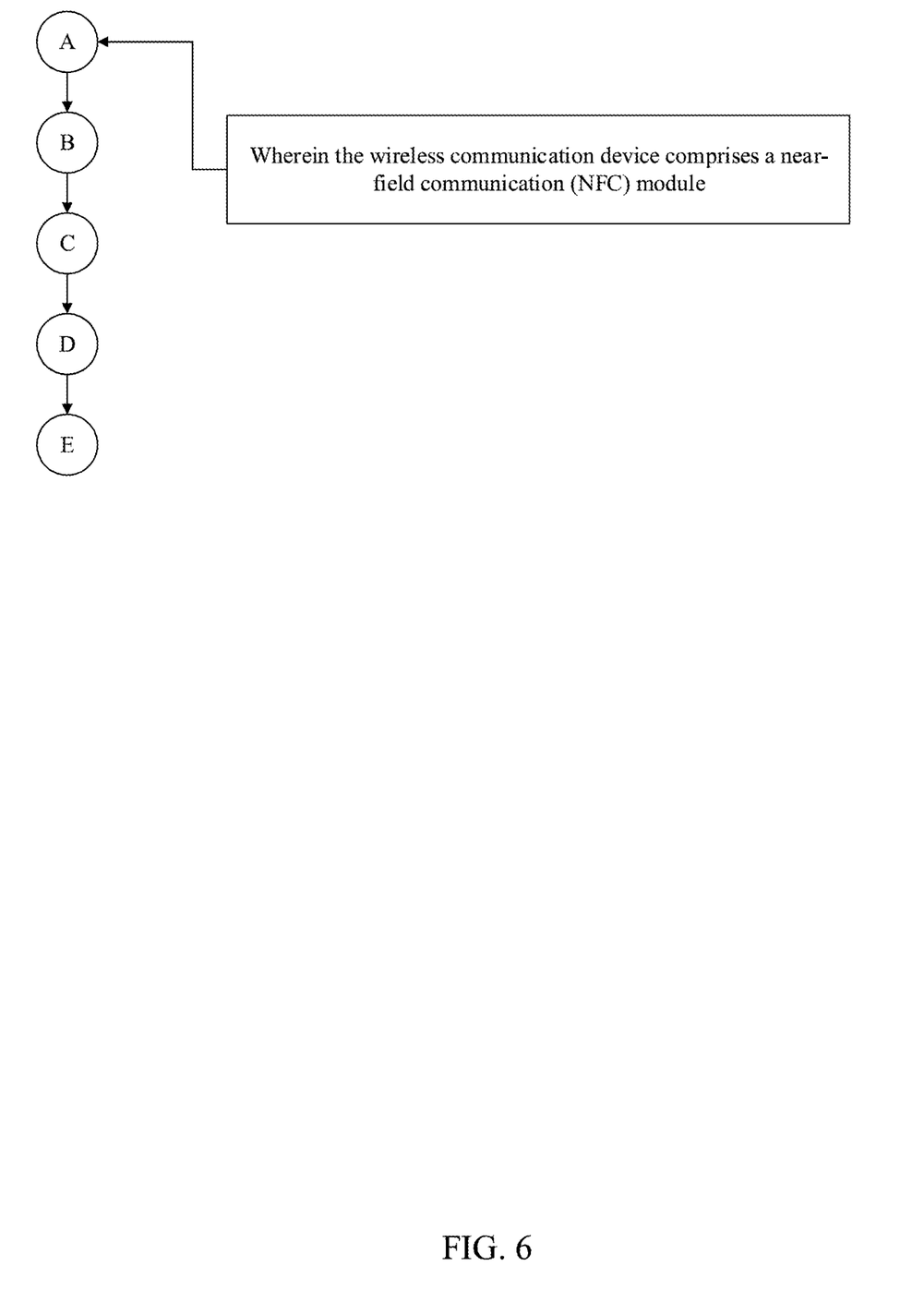
FIG. 6 is a stepwise flow diagram showing a step for including NFC functionality in the method of the present invention.

In some embodiments wherein the mobile unlocking device 10 is a mobile computing device such as a smartphone or the like, before the digital key payload is received, wireless communication may be established between the processing unit 1 and the mobile computing device through the wireless communication device 2, if a pairing request is received by the processing unit 1 from the mobile computing device through the wireless communication device 2 as shown in FIG. 5. Alternatively or additionally, in some embodiments the wireless communication device may comprise an NFC module, as shown in FIG. 6.

Furthermore, in some embodiments, a security authentication module 11 may be provided, wherein the security authentication module 11 is electronically connected to the wireless communication device 2. A pairing signal may be broadcast through the wireless communication device 2, and the pairing request may be received from the mobile computing device through the wireless communication device 2. Subsequently, the mobile computing device may be authenticated with the security authentication module 11, and the wireless communication may be established with the mobile unlocking device 10 through the wireless communication device 2, if the pairing request is received, and if the mobile unlocking device 10 is authenticated.

Furthermore, in some embodiments, a real-time clock (RTC) module may be provided, wherein the RTC module 7 is electronically connected to the processing unit 1. As such, the digital key payload may be validated with the RTC module 7 as shown in FIG. 7, wherein the RTC module may provide relevant parameters such as, but not limited to, a start time and an end time for the validation. Additionally or alternatively, in some embodiments, the mobile computing device may be authenticated with the security authentication module 11 in conjunction with the RTC module 7, wherein the RTC module 7 may provide relevant time parameters such as, but not limited to, a start time and an end time for the authentication.

As previously discussed, it is desirable to facilitate the original unlocking functionality of the host lock. Since the apparatus of the present invention is inserted into the circuit between the host motor output 101 and the host motor 102, the present invention must accommodate unlocking signals produced by the on-board processing unit of the host lock, and correspondingly carry out the intended functionality of said signals.

Figure 4:
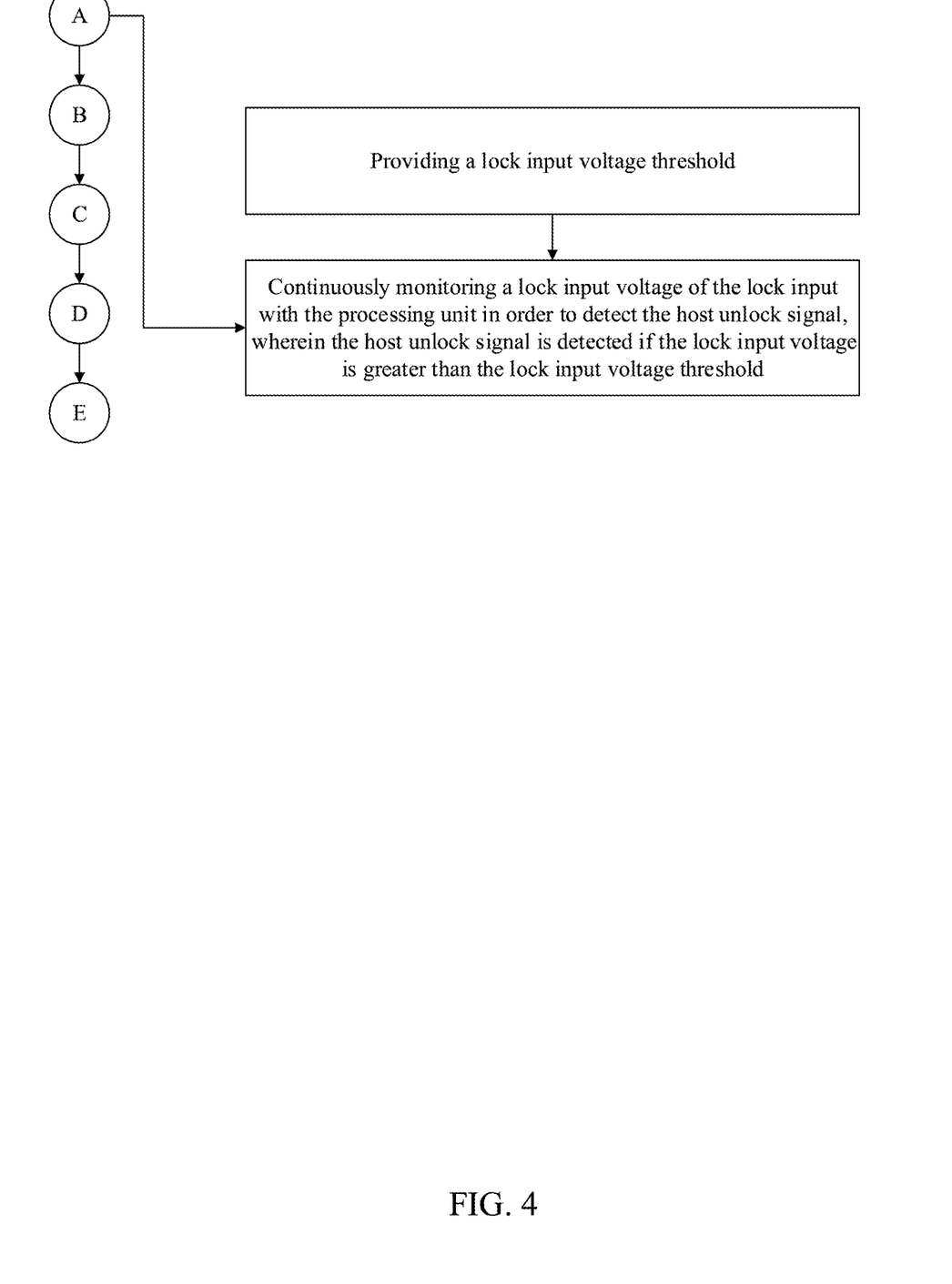
FIG. 4 is a stepwise flow diagram showing steps for detecting a host lock signal in the method of the present invention.

In one embodiment, which may be referred to as a repeater embodiment, the present invention simply acts as a repeater for the host unlocking signal. Given that the host unlocking signal corresponds to the host motor output 101, when a host unlocking signal is received by the processing unit 1 of the present invention through the host motor output 101, the processing unit 1 simply "repeats" the host unlocking signal by sending the unlocking signal to the host motor 102 through the lock output 5 of the present invention, as in steps A and B. In some embodiments as shown in FIG. 4, a lock input 4 voltage threshold may be provided, while a lock input 4 voltage of the lock input 4 is continuously monitored with the processing unit 1 in order to detect the host unlock signal, wherein the host unlock signal is detected if the lock input 4 voltage is greater than, or, as appropriate or desired, greater than or equal to, the lock input 4 voltage threshold.

Figure 8:
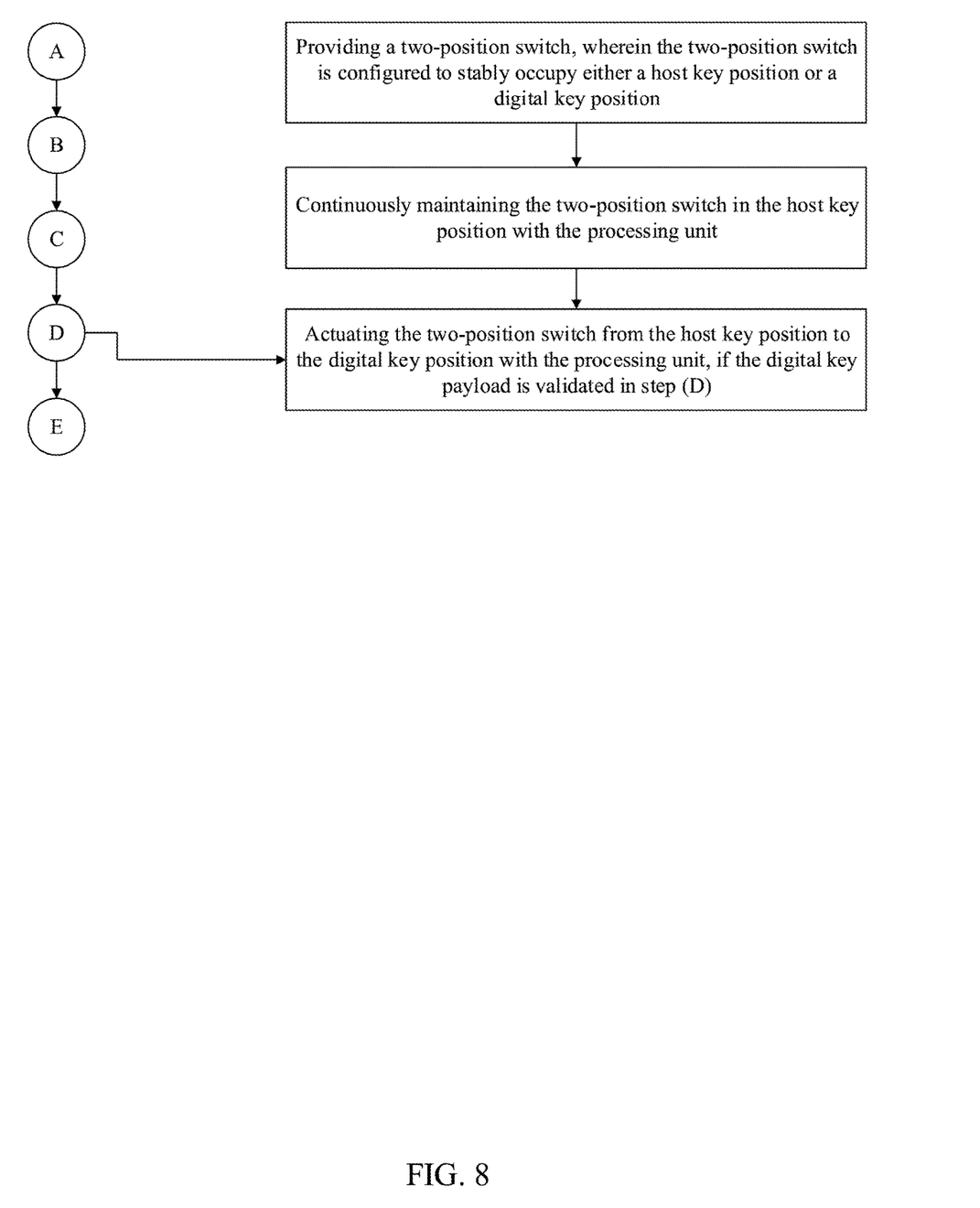
FIG. 8 is a stepwise flow diagram showing steps for incorporating a two-position switch in the method of the present invention.

In another embodiment, which may be referred to as a switch embodiment, the present invention is further provided with a two-position switch 6, wherein the two-position switch 6 is configured to stably occupy either a host key position 60 or a digital key position 61. The two-position switch 6 is electrically connected to the processing unit 1 such that the lock input 4 is electrically connected to the lock output 5 through the two-position switch 6 in the host key position 60, and the lock output 5 is electrically connected to the processing unit 1 through the two-position switch 6 in the digital key position 61. The host key position 60 connects the lock input 4 and the lock output 5, cutting off the processing unit 1 from the lock output 5 so that the processing unit 1 doesn't interfere with the operation of the host lock. The digital key position 61 connects the processing unit 1 and the lock output 5, cutting off the lock input so that the host lock is unaware of the operation of the present invention. In the switch embodiment, the repeater functionality is not possible because the lock input 4 is cut off from the processing unit 1 by the two-position switch 6, but the repeater functionality is also unnecessary in the switch embodiment because the host lock signal is passed directly through from the lock input 4 to the lock output 5. In the switch embodiment, as described in FIG. 8, the two-position switch 6 is continuously maintained in the host key position 60 with the processing unit 1, unless the digital key payload is received and validated in steps C and D, in which case the two-position switch 6 is actuated from the host key position 60 to the digital key position 61 in order to allow the unlocking signal to be sent from the processing unit 1 to the lock output 5. As such, in the two-position switch 6 embodiment, the original unlocking functionality is retained through the two-position switch 6 directly transferring the host unlocking signal from the lock input 4 to the lock output 5, while the added wireless unlocking functionality is enabled by recognizing when such wireless unlocking should occur.

Figure 10:
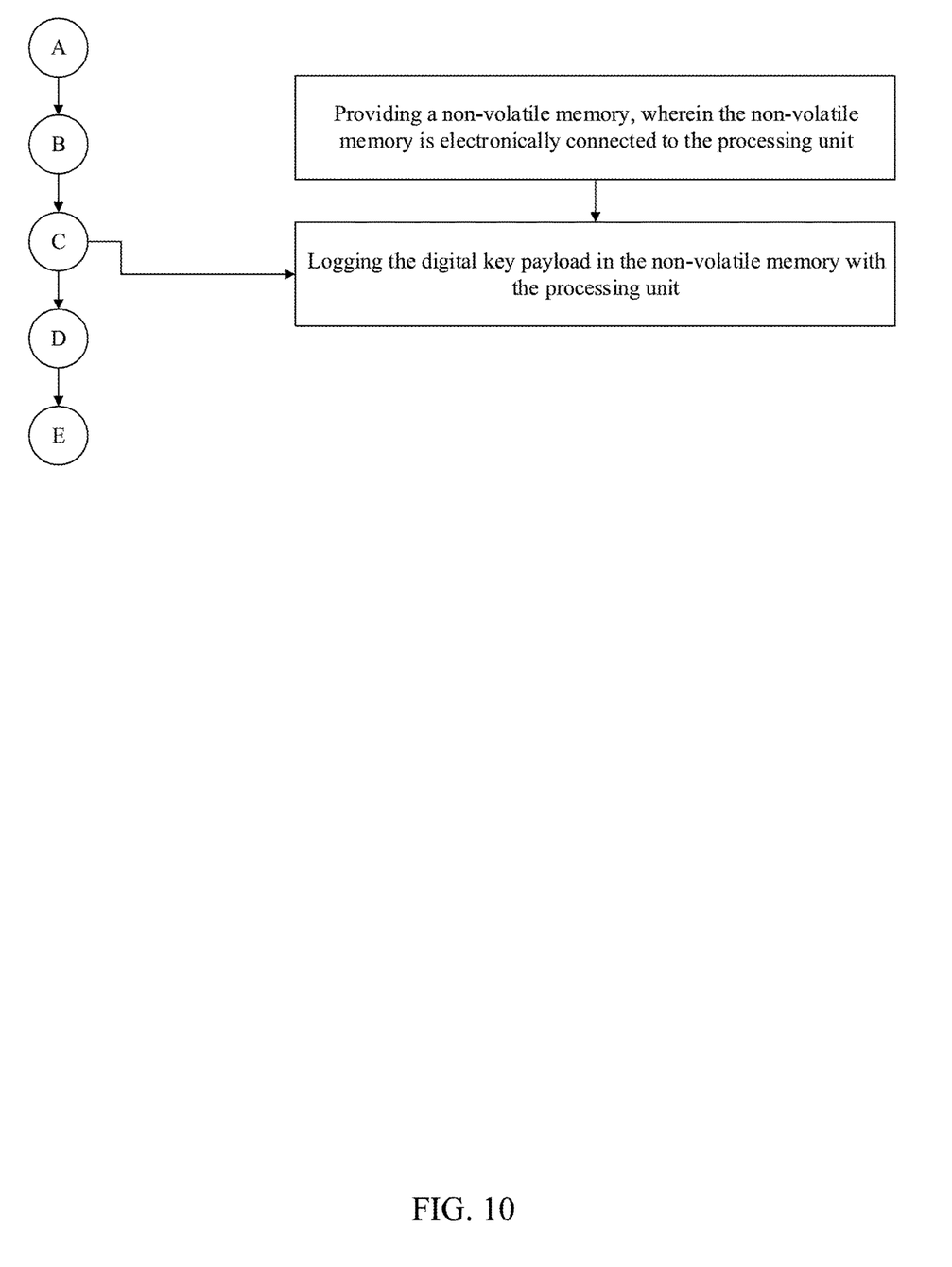
FIG. 10 is a stepwise flow diagram showing steps for logging digital key payloads in a non-volatile memory in the method of the present invention.

In some embodiments, as shown in FIG. 10, a non-volatile memory 8 may be further provided, wherein the non-volatile memory 8 is electronically connected to the processing unit 1. As such, each time the wireless unlocking functionality of the present invention is utilized, the digital key payload may be logged in the non-volatile memory 8 with the processing unit 1.

Figure 11:
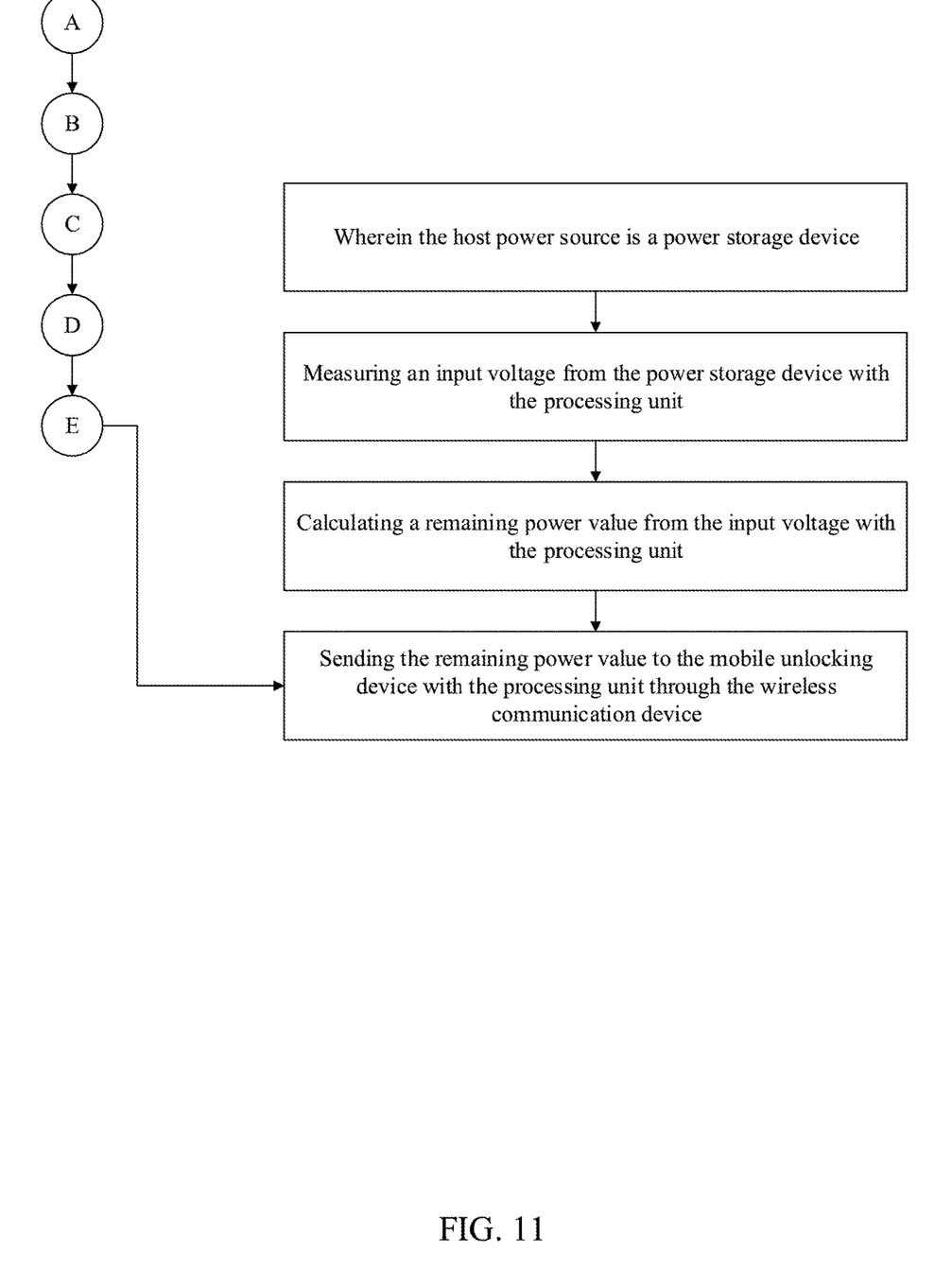
FIG. 11 is a stepwise flow diagram showing steps for returning a remaining power value to the mobile unlocking device in the method of the present invention.

In some embodiments, as shown in FIG. 11, wherein the host power source 103 is a power storage device, an input voltage may be measured from the power storage device with the processing unit 1. A remaining power value, estimated battery life, or similar value may then be calculated from the input voltage with the processing unit 1, and the remaining power value may be send to the mobile unlocking device 10 with the processing unit 1 through the wireless communication device 2. Thus, a user may be provided with an estimation of the host lock's remaining battery life through the present invention.

Figure 12:
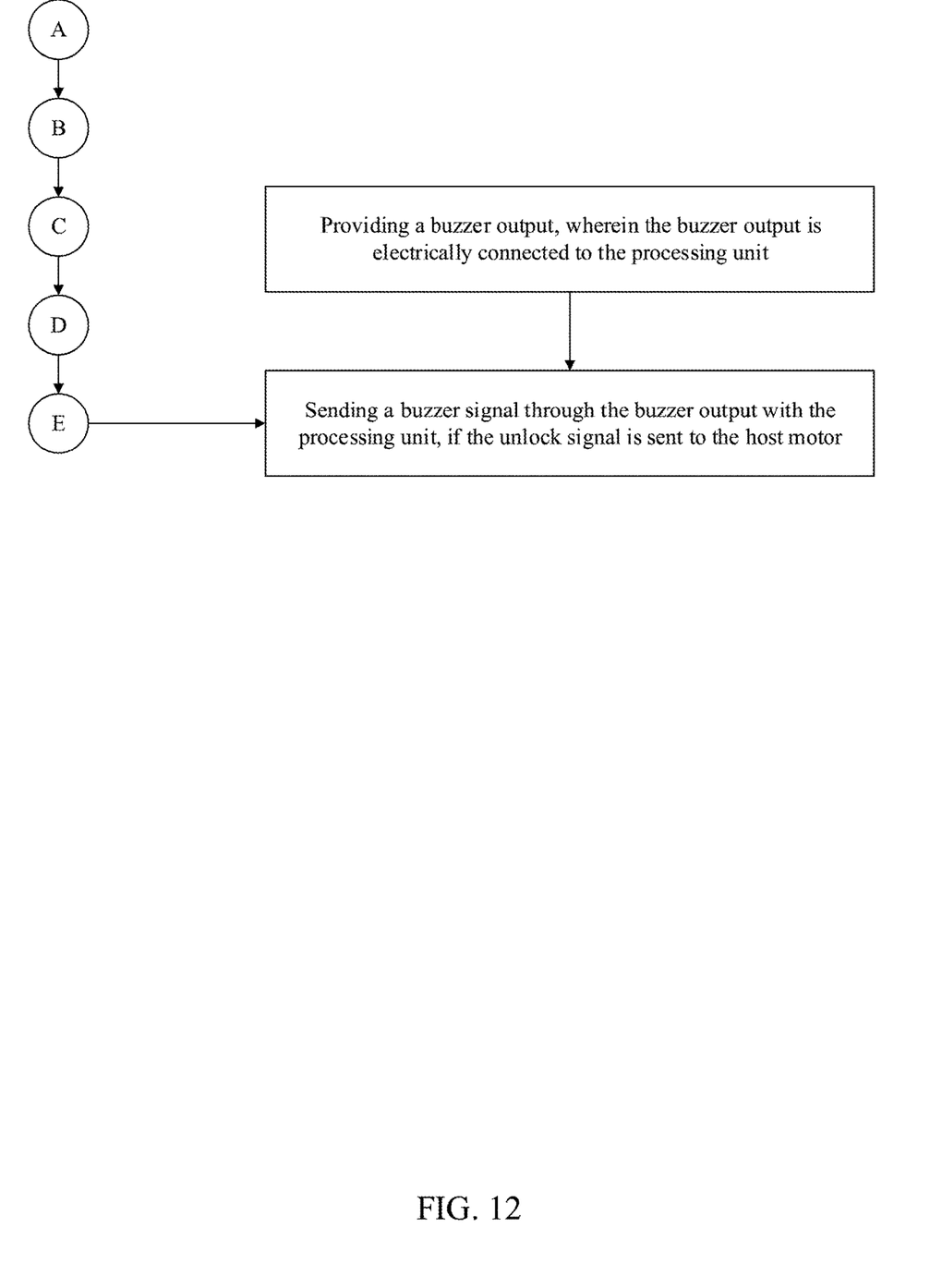
FIG. 12 is a stepwise flow diagram showing steps for actuating a buzzer upon a successful unlocking in the method of the present invention.

In some embodiments, as shown in FIG. 12, a buzzer output 9 may be further provided, wherein the buzzer output 9 is electrically connected to the processing unit 1. If the unlock signal is sent to the host motor 102 through the lock output 5, a buzzer signal is sent through the buzzer output 9 with the processing unit 1 in order to provide auditory feedback to the user when an unlocking is completed.

Although the invention has been explained in relation to its preferred embodiment, it is to be understood that many other possible modifications and variations can be made without departing from the spirit and scope of the invention as hereinafter claimed.

The invention claimed is:

1. An apparatus comprising:
   an electronic lock upgrade unit configured to interface with a host lock assembly, the electronic lock upgrade unit including:
   a power input configured to draw electrical power from a host power source of the host lock assembly;
   a lock input configured to receive a host unlocking signal from a host motor output of the host lock assembly;
   a lock output configured to send unlocking signals to a host motor of the host lock assembly;
   a wireless communication device configured to receive a digital key payload from a mobile unlocking device; and
   a processing unit, wherein the processing unit is configured to perform operations including:
      in response to receiving the host unlocking signal from the host lock assembly via the lock input, causing a first unlocking signal to be sent to the host motor of the host lock assembly; as well as
      in response to receiving the digital key payload from the mobile locking device via the wireless communication device, sending a second unlocking signal to the host motor of the host lock assembly.

2. The apparatus of claim 1, wherein the electronic lock upgrade unit includes:
   a two-position switch, wherein a first position of the two-position switch couples the lock input to the lock output and a second position of the two-position switch couples the lock output to the processing unit.

3. The apparatus of claim 2,
   wherein causing the first unlocking signal to be sent to the host motor includes setting the two-position switch to the first position such that the host unlocking signal is sent to the host motor as the first unlocking signal; and
   wherein sending the second unlocking signal to the host motor includes:
   setting the two-position switch to the second position, and
   generating, with the processing unit, the second unlocking signal.

4. The apparatus of claim 1,
   wherein causing the first unlocking signal to be sent to the host motor includes: receiving, with the processing unit, the host unlocking signal, and
   sending, with the processing unit, the received host unlocking signal as the first unlocking signal; and
   wherein sending the second unlocking signal to the host motor includes:
   generating, with the processing unit, the second unlocking signal.

5. The apparatus of claim 1, wherein the operations further include: measuring an input voltage of the power input;
   based on the input voltage, estimating a remaining life of the host power source; and
   sending, using the wireless communication device, an indication of the estimated remaining life.

6. The apparatus of claim 1, further comprising:
   a sound producing device;
   wherein the operations further include:
   in response to receiving the digital key payload, producing sound using the sound producing device.

7. The apparatus of claim 1, wherein the operations further include:
   validating, with the electronic lock upgrade unit, the digital key payload against one or more validation parameters selected from the group consisting of a digital signature, a start time, an end time, and a serialized key identifier.

8. A method comprising:
   monitoring, at an electronic lock upgrade unit coupled to a host lock assembly, a lock input for receipt of a host unlocking signal from the host lock assembly;
   in response to receiving the host unlocking signal from the host lock assembly, sending, from the electronic lock upgrade unit to a host motor of the host lock assembly, a first unlocking signal;
   receiving, with a wireless communication device of the electronic lock upgrade unit, a digital key payload from a mobile unlocking device; and
   in response to receiving the digital key payload from the mobile unlocking device, sending, from the electronic lock upgrade unit to the host motor of the host lock assembly, a second unlocking signal, wherein the electronic lock upgrade unit operates by drawing electrical power from the host lock assembly.

9. The method of claim 8, wherein the first unlocking signal and the second unlocking signal are sent via a lock output of the electronic lock upgrade unit, the method further comprising:
   setting a two-position switch of the electronic lock upgrade unit to a first position in which the lock input is coupled to the lock output such that a received host unlocking signal is sent to the host motor as the first unlocking signal; and
   in response to receiving the digital key payload, setting the two-position switch to a second position in which the lock output is coupled to a processing unit of the electronic lock upgrade unit, wherein the second unlocking signal is generated by the processing unit.

10. The method of claim 8, wherein a processing unit of the electronic lock upgrade unit monitors the lock input for receipt of the host unlocking signal and repeats a received host unlocking signal as the first unlocking signal.

11. The method of claim 8, further comprising:
    monitoring, with the electronic lock upgrade unit, a remaining battery life of the host lock assembly.

12. The method of claim 8, further comprising:
    logging the digital key payload in a non-volatile memory of the electronic lock upgrade unit.

13. The method of claim 8, further comprising:
    decrypting, with a security authentication module of the electronic lock upgrade unit, the digital key payload; and
    validating, with the electronic lock upgrade unit, the decrypted digital key payload against one or more validation parameters selected from the group consisting of a digital signature, a start time, an end time, and a serialized key identifier.

14. The method of claim 8,
    wherein the mobile unlocking device is a mobile computing device, the method further comprising:
    prior to receiving the digital key payload, pairing with the mobile unlocking device.

15. The method of claim 8, wherein sending the first unlocking signal provides an unlocking function equivalent to an unlocking function of a system including the host lock assembly but not the electronic lock upgrade unit.

16. A system comprising:
    a host lock assembly installed in a door, wherein the host lock assembly includes a host power source, a host motor output operable to send a host unlocking signal, and a host motor operable to unlock the door in response to receiving an unlocking signal; and an electronic lock upgrade unit installed in the door and coupled to the host lock assembly using a harness, wherein the electronic lock upgrade unit includes a wireless communication device that is operable to communicate with a mobile unlocking device, wherein the electronic lock upgrade unit is configured to perform operations including:

drawing electrical power from the host power source of the host lock assembly;

receiving the host unlocking signal from the host lock assembly;

in response to receiving the host unlocking signal from the host lock assembly, sending a first unlocking signal to the host motor of the host lock assembly; as well as in response to authenticating a digital key payload received from the mobile unlocking device via the wireless communication device, sending a second unlocking signal to the host motor of the host lock assembly.

17. The system of claim 16, wherein the host lock assembly is installed in a host lock housing positioned in a cutout of the door, and wherein the electronic lock upgrade unit is installed in the host lock housing.

18. The system of claim 16, wherein the host lock assembly is a particular model of a plurality of models of host lock assemblies, and wherein the harness includes connectors that are specific to the particular model.

19. The system of claim 16, wherein the electronic lock upgrade unit is configured to receive the host unlocking signal via a lock input of the electronic lock upgrade unit, and wherein the electronic lock upgrade unit is configured to send the first unlocking signal and the second unlocking signal via a lock output of the electronic lock upgrade unit; and wherein the electronic lock upgrade unit includes a processing unit and a two-position switch, wherein a first position of the two-position switch couples the lock input to the lock output and a second position of the two-position switch couples the lock output to the processing unit.

20. The system of claim 16, wherein the electronic lock upgrade unit is configured to log the digital key payload in a non-volatile memory of the electronic lock upgrade unit.

* * * * *